March 3, 1959

J. VAN DER STER ET AL 2,875,587

GAS-FRACTIONATING SYSTEM

Filed July 8, 1954

INVENTORS
JOHANNES VAN DER STER
JACOB WILLEM LAURENS KOHLER
BY

AGENT

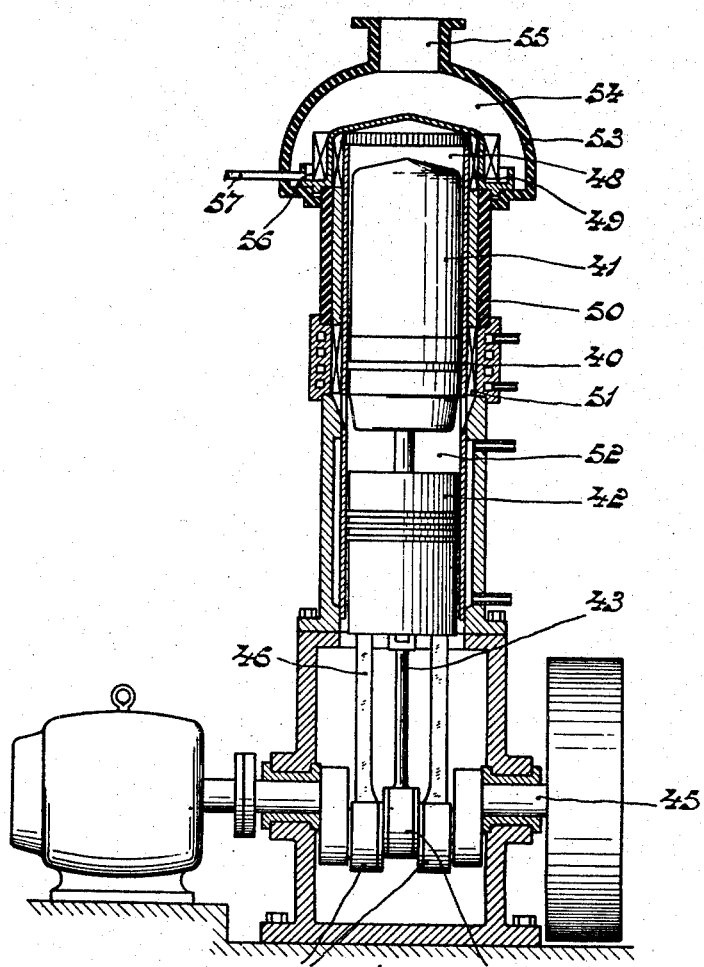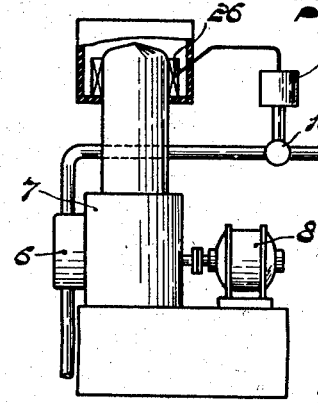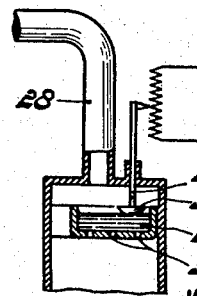

INVENTORS
JOHANNES VAN DER STER
JACOB WILLEM LAURENS KOHLER
BY
AGENT

United States Patent Office

2,875,587
Patented Mar. 3, 1959

2,875,587

GAS-FRACTIONATING SYSTEM

Johannes van der Ster and Jacob Willem Laurens Köhler, Eindhoven, Netherlands, assignors, by mesne assignments, to North American Philips Company, Inc., New York, N. Y., a corporation of Delaware Application July 8, 1954, Serial No. 442,062

Claims priority, application Netherlands July 9, 1953

2 Claims. (Cl. 62—40)

This invention relates to gas-fractionating systems comprising a gas-fractionating column from which heat is withdrawn by means of a gas-refrigerator. The hitherto known gas-separating installations, in which heat is not withdrawn from the column by means of a gas-refrigerator, generally comprise a comparatively complicated mechanism which allows, for example by adjusting cocks or the like, of varying the supply of the gas mixture to be fractioned and/or the removal of one or more of the fractions produced by the gas-separating system. Therefore, these known systems require constant supervision to interfere, if need be, and to adjust one or more cocks. In these systems, complete automatic adaptation of the inlet to the outlet under different conditions is rather difficult.

It has already been proposed to withdraw heat from the gas-separating column of a gas-fractionating system by means of a gas refrigerator. This permits the system to be equipped with a comparatively simple column, while obtaining products of a purity equal to that of the products obtained by means of the hitherto employed systems comprising more complicated columns.

Surprisingly enough it has now been found that in such a system it is moreover feasible to adapt the inlet automatically to the outlet.

In accordance with the invention at least one of the media to be supplied to the system and/or to be carried off is supplied and carried off in accordance with the caloric output of the apparatus. This dependency will be so chosen that the quantity supplied to or drawn from the column corresponds to that which the system is able to handle. Said dependency depends upon the resistance offered to the medium and upon insulation losses of the system. The term "caloric output" is here to be understood to mean the production of cold per unit time.

At several points of the system a value is found which depends upon the efficiency of the gas-refrigerator.

In one embodiment of the invention the supply of the gas mixture to be fractioned and/or the removal of at least one of the fractions is controlled in accordance with the pressure difference due to the flow-resistance through at least a part of the conduit for the vapour between the column and the refrigerator. The method may advantageously be employed if the pressure in the gas-fractionating column itself exceeds the atmospheric pressure. If the pressure, where the gas-mixture to be separated is supplied to the column, is lower than the atmospheric pressure then, in one embodiment of the invention, a different construction may be employed with which the supply of the gas-mixture to be separated and/or the removal of at least one of the fractions is controlled in accordance with the difference between a pressure occurring in the gas-fractionating system and the atmospheric pressure.

In a further embodiment of the invention, the supply of the gas mixture to be separated and/or the removal of at least one of the fractions is controlled by means of a liquid meter disposed in a conduit through which passes a quantity of condensation liquid proportional to the condensation liquid formed per unit time by the gas-refrigerator. Said liquid meter permits, for example, a quantity, a weight, the rate of flow of the liquid or the level of a liquid to be measured.

In a further embodiment of the invention, the supply of the gas mixture to be separated and/or the removal of at least one of the fractions is controlled in accordance with the temperature of the head of the gas-refrigerator. Said temperature may, for example, be measured at the wall defining the freezing space or at the fins of the freezer.

In a very simple construction of a system, from which at least one of the fractions is carried off in the liquid state, the outlet conduit for said fraction comprises a liquid lock. In this case no further means are required for supplying the gas mixture to be fractioned to the column.

If the fraction having the lower or lowest boiling point is drawn in the form of vapour from the column, a further embodiment of the invention permits the supply of the gas mixture to be fractioned and/or the removal of the fraction having the lower boiling point to be so controlled as to constantly carry off the correct quantity of said fraction upon output variations.

In order that the invention may be readily carried into effect, it will now be described with reference to the accompanying drawings, given by way of example, in which Fig. 1 shows a gas-fractionating system, in which the gas mixture to be fractioned is supplied in accordance with the pressure difference in the conduit for the vapour between the gas-refrigerator and the column.

In Fig. 2, a pressure lower than the atmospheric pressure prevails where the gas mixture to be separated is supplied to the column, this gas mixture being supplied in accordance with the pressure difference between some point of the system and the atmosphere.

Fig. 3 shows part of a system, in which the temperature of the head of the gas-refrigerator determines the quantity of the gas-mixture supplied to the fractionating column.

Fig. 4 shows a liquid meter for use in the system.

Fig. 7 shows a gas-refrigerator for use in the aforesaid systems.

Figures 1, 2:
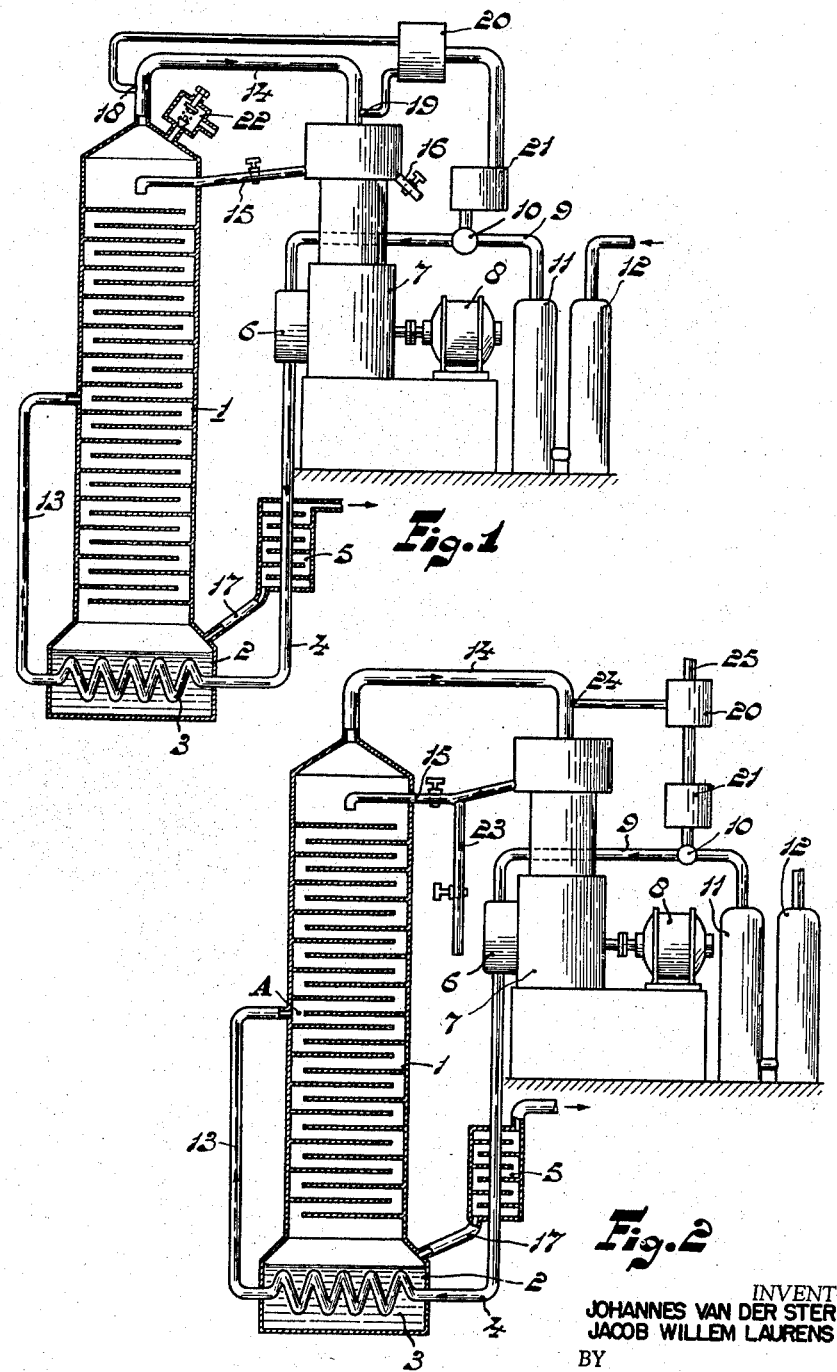

The gas-fractionating system shown in Fig. 1 comprises a gas-fractionating column 1 and a boiler 2. This boiler contains a heat exchanger 3 with a supply conduit 4, which includes a heat exchanger 5 and is joined by a compressor 6. This compressor which is secured to the shaft of a gas-refrigerator 7 and, jointly with the refrigerator, is driven by an electric motor 8, comprises a suction pipe 9. This pipe comprises a cock 10 and vessels 11, 12 wherein the gas mixture, for example air, drawn in by the compressor 6 is purified. The heat exchanger 3 is connected with the column through a conduit 13. At its upper end the column comprises a conduit 14 through which the vapour there present is supplied to the gas-refrigerator 7. In this refrigerator, the vapour condenses and a part of the condensation liquid is supplied as reflux through a conduit 15 to the column, another part being removed from the system through a conduit 16. The fraction having a higher boiling point is removed from the boiler through a conduit 17 and the heat exchanger 5. The conduit 14 for the vapour is provided with two measuring points 18 and 19 where the pressure difference across this conduit is measured. The pressure difference is transmitted to servo-mechanisms 20 and 21 by means of which the cock 10 is adjustable. The column comprises a pressure safety device 22.

The operation of a system is as follows: the gas mixture to be fractioned, for example air, is supplied through the compressor 6 to the heat exchangers 5 and 3. The air drawn in is freed from water vapour and carbonic acid in the vessels 11 and 12.

In the heat exchanger 5, the air is cooled by the oxygen escaping from the boiler; further cooling occurs in the heat exchanger 3, heat being given off to the liquid in the boiler that this liquid is vaporized. The cooled air is subsequently supplied through the conduit 13 to the column in which the air is fractioned. At the upper end the vapour there present, that is to say nitrogen, flows through the conduit 14 to the refrigerator, while a part of the condensation liquid formed by the refrigerator flows back to the column through a conduit 15.

Upon an increase of the caloric output of the refrigerator, the pressure in the condensation space of the gas refrigerator will decrease with the result that more vapour will pass through the conduit 14 and the pressure difference will increase between the points 18 and 19. The servo-mechanisms 20 and 21 then adjusts the cock 10 so as to supply a larger quantity of the gas mixture to the column. If, however, the caloric output of the gas-refrigerator is zero, no vapour will flow to the refrigerator so that there is no pressure difference between the points 18, 19 and the cock 10 closes the conduit 9, this interrupting the supply of gas mixture to the column. The aforesaid control functions independently of whether an excess pressure, atmospheric pressure or sub-atmospheric pressure occurs in the column.

Fig. 2 shows a system which corresponds on the whole to that of Fig. 1, corresponding parts being provided with the same reference numerals.

In this system, the fraction having the higher boiling point is carried off in the liquid state through a conduit 23 comprising a cock. The conduit 14 includes a pressure meter 24, the difference between this pressure and the atmospheric pressure measured by means of the conduit 25 determining the position of the cock 10 by means of the servo-mechanisms 20 and 21. The compressor 6 supplies the gas mixture to be separated at a low excess pressure so that the pressure at point A, where the gas mixture is supplied to the column, exceeds the atmospheric pressure.

Upon an increase of the caloric output in this embodiment, more vapour is condensed with the result that the pressure decreases at the measuring point 24. This results in that the servo-mechanisms 20 and 21 adjust the cock 10 to supply a larger quantity of gas mixture to the column.

Upon an increase of the caloric output in this embodiment, more vapour is condensed with the result that the pressure decreases at the measuring point 24. This results in that the servo-mechanisms 20 and 21 adjust the cock 10 to supply a larger quantity of gas mixture to the column.

Fig. 3 shows a gas refrigerator for use in the aforesaid systems. In this case, however, the gas refrigerator 7 and the compressor 6 are driven by the electric motor 8. The suction pipe 9 of the compressor comprises a cock 10. By means of a temperature meter 26 the temperature of the head of the gas-refrigerator is measured. This temperature determines with the use of a servo-mechanism 27 the position of the cock 10. Upon an increase of the caloric output the cock 10 opens but is closed upon a decrease thereof. The temperature meter may, for example, be a vapour pressure thermostat or a resistor having a negative temperature coefficient.

Fig. 4 shows a liquid meter for use in an outlet through which the condensation liquid or a proportional part, formed by the gas refrigerator, is carried off. In this instance, the liquid meter is joined by a supply conduit 28 for the condensation liquid, which is collected in a receptacle 29 with openings 30 through which the condensation liquid flows off. The receptacle contains a float 31 with an arm 32. A displacement of this arm causes, through a servo-mechanism (not shown), a variation of the position of a cock in the supply or outlet conduit. Upon an increase of the caloric output of the refrigerator a larger quantity of condensation liquid is produced with the result that the float rises and a larger quantity of the gas mixture is supplied or a larger quantity of the product is carried off. Upon a decrease of the output the float will descend and the cock 10 is closed.

Figure 5:
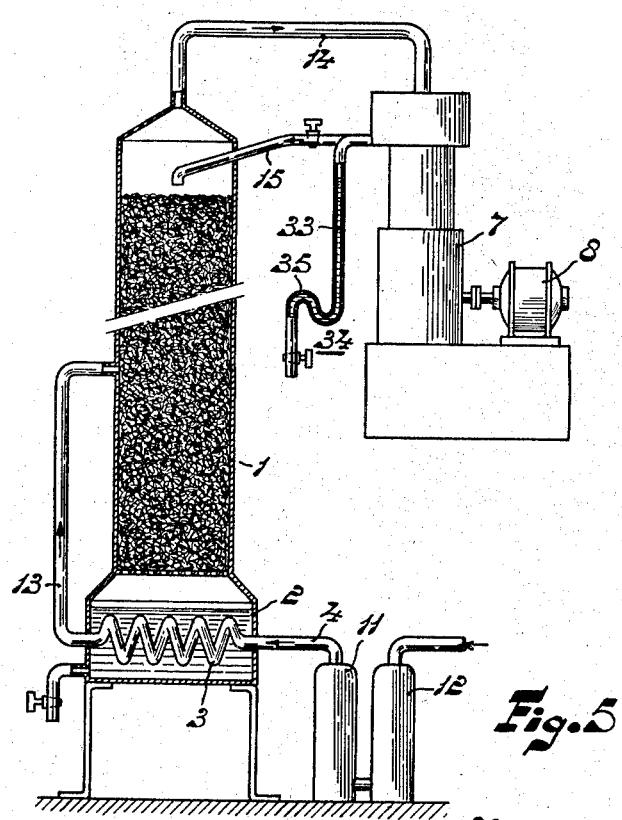
Fig. 5 shows a gas-fractionating system, in which the gas mixture to be separated is supplied to the column through a liquid lock.

The gas-fractionating system shown in Fig. 5 corresponds on the whole to the aforesaid systems, corresponding parts bearing the same reference numerals. The gas-refrigerator 7 comprises a vertical outlet conduit 33 with a liquid lock 34. Due to the sub-atmospheric pressure prevailing in the space of the gas refrigerator, wherein the vapour expelled from the column condenses, a liquid column forms in the outlet conduit 33. By making this conduit sufficiently long said column allows the gas mixture to be supplied to the column. The gas mixture to be fractioned first passes through the vessels 11 and 12, wherein it is purified and then passes through the heat exchanger 3 and through the conduit 13 to the column in which it is fractioned.

Upon an increase of the caloric output of the system the sub-atmospheric pressure will also decrease in the condensation space, thus producing a higher liquid column in the conduit 33 and supplying a larger quantity of gas to the column. If the output decreases and drops to zero, the liquid column in the conduit 33 and the level difference with regard to the upper bend 35 of the lock will also approach to zero, thus interrupting the supply of gas mixture to the column.

Figure 6:
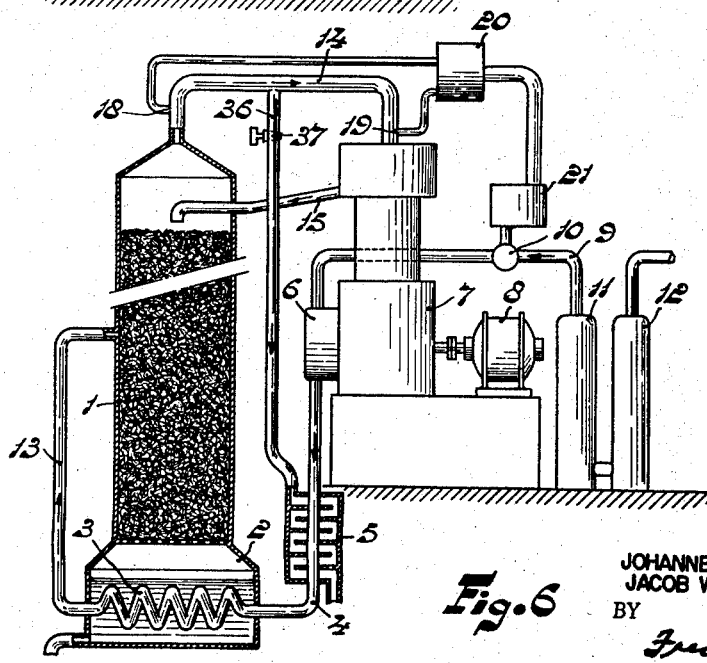
Fig. 6 shows a gas-fractionating system, in which the fraction having the higher or highest boiling point is obtained in the vapour state.

In the system shown in Fig. 6 corresponding parts are again provided with the same reference numerals. In this system, the conduit 14 comprises an outlet 36 which is joined by the heat exchanger 5 and through which a part of the vapour fraction having the lower boiling point and produced in the column is carried off. At the top the column has two measuring points 18 and 19 for measuring the pressure difference in said conduit, pressure difference variations involving, through the servo-mechanism 20, 21 and cock 10, variations of the quantity of gas supplied to the compressor 6. In this embodiment of the invention, the dependency of the quantity of gas supplied to the column and the efficiency is such that the correct quantity of said fraction is carried off upon efficiency variations. This may be effected by adjustment of the cock 37 in the outlet pipe for the nitrogen, which cock is likewise adjustable, not shown in the drawing, by means of the servo-mechanisms 21 and 22. The dependency referred to is determined by the resistance of the conduit 36 and heat exchanger 5 and by insulation losses of the system.

Fig. 7 shows a gas-refrigerator on a larger scale. This refrigerator comprises a cylinder 40 wherein a displacer 41 and a piston 42 are adapted to reciprocate. To this end the displacer 41 is coupled through a connecting rod system 43 to a crank 44 of a crank shaft 45, the piston 42 being coupled to cranks 47 through connecting rod systems 46. The cranks 44 and 47 subtend an angle so that the piston and the displacer move upwards and downwards with a constant phase difference. Above the displacer there is a space 48 influenced by it, the so-called freezing space, which is connected through a freezer 49, a regenerator 50 and a cooler 51 with a space 52 between the displacer and the piston. At the upper end the refrigerator comprises a heat insulating wall 53 to form a condensation space 54. Said space has an inlet opening 55 and an annular duct 56 for the condensation liquid, which duct is provided with an outlet 57 for the condensation liquid.

The represented gas refrigerator is a displacer apparatus. Alternatively, the gas refrigerator may be a double-acting apparatus or an apparatus whereof the working space is combined with that of a hot-gas engine. Gas refrigerators permit very low temperatures of, say, −200 degrees centigrade to be attained in one stage, so that these apparatus may be employed for condensing vapours having a low boiling point, for example for condensing nitrogen at atmosphere pressure.

In the aforesaid examples the quantity of gas supplied or drawn off is changed by adjusting a cock. It will, however, be appreciated that said quantity may alternatively be changed by other means, for example by changing the speed of the compressor or the number of strokes of a plunger pump.

What is claimed is:

1. A gas fractionating apparatus comprising a fractionating column for separating a gaseous mixture into at least two fractions, an inlet for introducing said gaseous mixture into said column under substantially atmospheric conditions, a cold-gas refrigerator comprising a cylinder, two pistons operating in said cylinder with a constant phase difference which together with said cylinder define two chambers in which a closed thermodynamic cycle is performed by a gaseous medium of invariable chemical composition in one and the same state of aggregation, the volume of gaseous medium in said chambers varying continuously while one of said chambers has a low temperature and the other chamber has a higher temperature, a cooler, a regenerator and a freezer connecting the chambers with one another, a condenser chamber adjacent to said freezer, a first duct connecting said column with the condenser chamber to withdraw the fraction with the lowest boiling point from said column, a second duct connecting said condenser chamber and column and having a branch duct which is connected to the atmosphere, said branch duct being provided with a liquid lock and having part of the condensed fraction therein, said liquid lock maintaining a pressure difference between the atmosphere and the inlet of said column.

2. A gas fractionating apparatus as claimed in claim 1 wherein said liquid lock includes a pipe having two spaced, substantially vertical sections and an intermediate, substantially sinusoidal section connecting said vertical sections.

References Cited in the file of this patent

UNITED STATES PATENTS

| | | |
|---|---|---|
| 1,512,268 | Barbet | Oct. 21, 1924 |
| 2,160,077 | Maiuri | May 30, 1939 |
| 2,195,987 | Gomonet | Apr. 2, 1940 |
| 2,280,383 | De Baufre | Apr. 21, 1942 |
| 2,409,458 | Van Nuys | Oct. 15, 1946 |
| 2,446,534 | Fausek | Aug. 10, 1948 |
| 2,525,660 | Fausek | Oct. 10, 1950 |
| 2,553,550 | Collins | May 22, 1951 |
| 2,567,454 | Taconis | Sept. 11, 1951 |
| 2,599,133 | Schilling | June 3, 1952 |
| 2,617,275 | Goff | Nov. 11, 1952 |
| 2,650,483 | Schuftan | Sept. 1, 1953 |
| 2,685,179 | Paget | Aug. 3, 1954 |